United States Patent
Komura et al.

(10) Patent No.: US 10,358,109 B2
(45) Date of Patent: Jul. 23, 2019

(54) VEHICLE SEAT WITH SIDE AIRBAG APPARATUS

(71) Applicant: TOYOTA JIDOSHA KABUSHIKI KAISHA, Aichi-ken (JP)

(72) Inventors: Takamichi Komura, Okazaki (JP); Osamu Fukawatase, Miyoshi (JP); Masato Kunisada, Susono (JP); Hiroe Sugawara, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 84 days.

(21) Appl. No.: 15/714,797

(22) Filed: Sep. 25, 2017

(65) Prior Publication Data
US 2018/0093636 A1    Apr. 5, 2018

(30) Foreign Application Priority Data
Oct. 3, 2016 (JP) .................. 2016-196009

(51) Int. Cl.
| | |
|---|---|
| *B60R 21/00* | (2006.01) |
| *B60R 21/207* | (2006.01) |
| *B60R 21/231* | (2011.01) |
| *B60R 21/217* | (2011.01) |
| *B60R 21/233* | (2006.01) |
| *B60R 21/235* | (2006.01) |

(Continued)

(52) U.S. Cl.
CPC ...... *B60R 21/23138* (2013.01); *B60R 21/207* (2013.01); *B60R 21/217* (2013.01); *B60R 21/2165* (2013.01); *B60R 21/233* (2013.01); *B60R 21/2338* (2013.01); *B60R 2021/0032* (2013.01); *B60R 2021/0044* (2013.01); *B60R 2021/23146* (2013.01); *B60R 2021/23324* (2013.01); *B60R 2021/23382* (2013.01); *B60R 2021/23538* (2013.01)

(58) Field of Classification Search
CPC ............ B60R 21/23138; B60R 21/207; B60R 21/2165; B60R 2021/23146; B60R 21/2338
See application file for complete search history.

(56) References Cited

U.S. PATENT DOCUMENTS

| | | | |
|---|---|---|---|
| 6,099,026 A | 8/2000 | Ando et al. | |
| 7,971,900 B2 * | 7/2011 | Lim | ........ B60R 21/207 280/730.2 |
| 8,590,925 B2 | 11/2013 | Kwon et al. | |

(Continued)

FOREIGN PATENT DOCUMENTS

| | | |
|---|---|---|
| EP | 2960117 A1 | 12/2015 |
| JP | H9-39710 A | 2/1997 |

(Continued)

*Primary Examiner* — Faye M Fleming
(74) *Attorney, Agent, or Firm* — Hauptman Ham, LLP (57) ABSTRACT

A vehicle seat includes an outer side frame, an inflator, and a side airbag including a front chamber and a rear chamber. The inflator is configured such that the rear chamber inflates and deploys faster at a higher pressure than a front chamber, and the side airbag is stored in a side portion in a state in which the side airbag straddles the outer side frame from a vehicle front side in a vehicle-width direction and a portion of the side airbag including the front chamber is folded outward of the outer side frame in the vehicle-width direction.

15 Claims, 5 Drawing Sheets

(51) Int. Cl.
*B60R 21/2165* (2011.01)
*B60R 21/2338* (2011.01)

(56) References Cited

U.S. PATENT DOCUMENTS

| | | |
|---|---|---|
| 2007/0273129 A1 | 11/2007 | Inoue |
| 2009/0020988 A1 | 1/2009 | Sato et al. |
| 2011/0169250 A1 | 7/2011 | Breuninger et al. |
| 2012/0248745 A1 | 10/2012 | Kwon et al. |
| 2013/0200599 A1 | 8/2013 | Shamoto et al. |
| 2015/0021884 A1 | 1/2015 | Hiraiwa et al. |
| 2015/0137493 A1 | 5/2015 | Fujiwara |
| 2015/0197212 A1 | 7/2015 | Fujiwara |
| 2015/0367806 A1 | 12/2015 | Fujiwara |
| 2015/0367811 A1 | 12/2015 | Kobayashi et al. |
| 2016/0159307 A1 | 6/2016 | Fujiwara |
| 2018/0222435 A1* | 8/2018 | Fukawatase ...... B60R 21/23138 |
| 2018/0265032 A1* | 9/2018 | Kobayashi ............ B60R 21/207 |

FOREIGN PATENT DOCUMENTS

| | | | | |
|---|---|---|---|---|
| JP | H10-244895 A | | 9/1998 | |
| JP | 2007-314075 A | | 12/2007 | |
| JP | 2008-087631 A | | 4/2008 | |
| JP | 2009-023494 A | | 2/2009 | |
| JP | 2011-527965 A | | 11/2011 | |
| JP | 2013-147119 A | | 8/2013 | |
| JP | 2014-080169 A | | 5/2014 | |
| JP | 2014-141159 A | | 8/2014 | |
| JP | 2015-96396 A | | 5/2015 | |
| JP | 2017210072 A | * 11/2017 | ........... B60R 21/207 |
| KR | 10-2009-0061793 A | | 6/2009 | |
| KR | 10-2012-0110265 A | | 10/2012 | |
| WO | 97/45297 A1 | | 12/1997 | |
| WO | 2014/013822 A1 | | 1/2014 | |
| WO | 2014/123055 A1 | | 8/2014 | |

* cited by examiner

VEHICLE SEAT WITH SIDE AIRBAG APPARATUS

INCORPORATION BY REFERENCE

The disclosure of Japanese Patent Application No. 2016-196009 filed on Oct. 3, 2016 including the specification, drawings and abstract is incorporated herein by reference in its entirety.

BACKGROUND

1. Technical Field

The disclosure relates to a vehicle seat with a side airbag apparatus.

2. Description of Related Art

A side airbag apparatus described in Japanese Unexamined Patent Application Publication No. 2009-023494 (JP 2009-023494 A) includes a main airbag which is folded like bellows forward of an outer side frame of a seat back in a seat front-rear direction and outward of the outer side frame in a seat-width direction, an auxiliary airbag which is folded like bellows inward of the outer side frame in the seat-width direction, and a single inflator fixed to the outside of the outer side frame in the seat-width direction. The base end portion of the auxiliary airbag extends outward in the seat-width direction from the seat front side of the outer side frame and is connected to the base end portion of the main airbag. The inflator is stored in the base end portion of the auxiliary airbag and supplies gas to the auxiliary airbag prior to the main airbag when a side collision is detected. Accordingly, the auxiliary airbag is configured to inflate and deploy in the side portion of the seat back prior to the main airbag, and move a seated occupant toward the inside in the seat-width direction (toward the center side in a vehicle-width direction).

In a vehicle seat with a side airbag apparatus described in Japanese Unexamined Patent Application Publication No. 2014-080169 (JP 2014-080169 A), a side airbag having a forward deployment airbag partitioned into front and rear bag portions and an inward inflation airbag and a single inflator are disposed inward of an outer side frame of a seat back in a seat-width direction. When a side collision is detected, the inflator ejects gas in the vicinity of a joint portion between the rear bag portion of the forward deployment airbag and the inward inflation airbag. Accordingly, the inward inflation airbag having a smaller capacity than the forward deployment airbag is configured to inflate fast while being supported by the outer side frame, and quickly and effectively restrain the spine of a seated occupant having a high resistance value from an obliquely rear side.

SUMMARY

In the disclosure described in JP 2009-023494 A, since the auxiliary airbag which is folded like bellows inward of the outer side frame in the seat-width direction is supplied with the gas from the inflator disposed outward of the outer side frame in the seat-width direction (on the outer side in the vehicle-width direction), supply of the gas into the auxiliary airbag is delayed. Therefore, there is room for improvement from the viewpoint of reducing the time taken for the movement of the seated occupant toward the center side in the vehicle-width direction by the auxiliary airbag.

In the disclosure described in JP 2014-080169 A, a configuration in which the folded side airbag is stored together with the inflator inward of the outer side frame in the seat-width direction (the center side in the vehicle-width direction; the seated occupant side) is employed. Therefore, it is difficult to mount the side airbag in the seat back which is set to have a narrow gap between the outer side frame and the seated occupant.

The disclosure provides a vehicle seat with a side airbag apparatus which can move a seated occupant toward a center side in a vehicle-width direction fast at the time of a side collision, and is provided with a side airbag that is easily mounted in a seat back set to have a narrow gap between an outer side frame and the seated occupant.

A first aspect of the disclosure relates to a vehicle seat with a side airbag apparatus including: an outer side frame disposed in a side portion on an outside of a seat back in a vehicle-width direction; an inflator attached to a center side of the outer side frame in the vehicle-width direction; and a side airbag that stores the inflator. The side airbag includes a partition portion that partitions the side airbag into a front chamber and a rear chamber, and the partition portion includes a communication port. The inflator is stored in the rear chamber, and the rear chamber is configured to inflate and deploy faster at a higher pressure than the front chamber. The side airbag is stored in the side portion in a state in which the side airbag straddles the outer side frame from a vehicle front side in the vehicle-width direction and a portion of the side airbag including the front chamber is folded outward of the outer side frame in the vehicle-width direction.

According to the aspect, the inflator is attached to the center side in the vehicle-width direction of the outer side frame disposed in the side portion on the outside of the seat back in the vehicle-width direction. The inflator is operated, for example, in a case where a side collision of the vehicle is detected or predicted. The rear chamber of the side airbag having the inflator stored therein then inflates and deploys faster at a higher pressure than the front chamber while receiving a reaction force toward the center side in the vehicle-width direction from the outer side frame so as to press the seated occupant toward the center side in the vehicle-width direction. Accordingly, the seated occupant can be moved toward the center side in the vehicle-width direction fast. Furthermore, the side airbag is stored in the side portion in a state in which the side airbag straddles the outer side frame from the vehicle front side in the vehicle-width direction and the portion of the side airbag including the front chamber is folded outward of the outer side frame in the vehicle-width direction (on the opposite side of the outer side frame from the seated occupant). Accordingly, mounting of the side airbag in the seat back which is set to have a narrow gap between the outer side frame and the seated occupant is facilitated.

In the vehicle seat according to the aspect, the front chamber in a state in which inflation and deployment is completed may be configured to restrain front portions of a chest and an abdomen of a seated occupant, and the rear chamber in the state in which inflation and deployment is completed may be configured to restrain rear portions of the chest and the abdomen of the seated occupant and a front portion and a rear portion of a waist of the seated occupant.

According to the aspect, the rear chamber which inflates and deploys faster at a higher pressure than the front chamber while receiving a reaction force toward the center side in the vehicle-width direction from the outer side frame restrains a wide range from the chest to the waist of the seated occupant (presses the wide range toward the center side in the vehicle-width direction). Moreover, since the rear chamber presses the front portion and the rear portion of the waist of the seated occupant, compared to a case where the rear portion of the waist is solely pressed by the rear chamber, the pressing direction of the waist is likely to follow the vehicle-width direction. From the above description, it becomes possible to effectively move the seated occupant toward the center side in the vehicle-width direction.

The vehicle seat according to the aspect may further include an enclosing member that is locked to the outer side frame and surrounds the side airbag stored in the side portion in a plan sectional view of the seat back. The enclosing member may include a weak portion which breaks by an inflation pressure of the side airbag.

According to the aspect, the enclosing member locked to the outer side frame surrounds the side airbag stored in the side portion of the seat back in the plan sectional view of the seat back. Accordingly, the portion including the front chamber side in the side airbag in the stored state, that is, the portion of the side airbag folded outward of the outer side frame in the vehicle-width direction, can be held in the folded state with a simple configuration. Moreover, since the enclosing member includes the weak portion which breaks by the inflation pressure of the side airbag, it is possible to allow the side airbag to inflate and deploy with a simple configuration.

In the vehicle seat according to the aspect, the enclosing member may be formed of a resin or a cloth impregnated with a resin.

According to the aspect, the enclosing member that surrounds the side airbag stored in the side portion of the seat back is formed of a resin or a cloth impregnated with a resin (for example, a nonwoven fabric such as felt). Therefore, the folded state of the side airbag can be firmly held.

In the vehicle seat according to the aspect, the enclosing member may be formed of a flexible sheet-shaped material.

According to the aspect, the enclosing member that surrounds the side airbag stored in the side portion of the seat back is formed of a flexible sheet-shaped material (for example, cloth or paper). Therefore, the enclosing member can be formed with a simple configuration.

In the vehicle seat according to the aspect, in the side airbag stored in the side portion, a portion of the side airbag positioned outward of the outer side frame in the vehicle-width direction may be disposed to be offset toward the vehicle front side from a portion of the side airbag positioned on the center side of the outer side frame in the vehicle-width direction.

According to the aspect, with the above-described configuration, the portion of the side airbag folded outward of the outer side frame in the vehicle-width direction easily inflates and deploys toward the vehicle front side. Furthermore, the side airbag in the stored state has an outer shape along the surface on the seated occupant side in the side portion of the seat back in the plan sectional view of the seat back. Accordingly, the mountability of the side airbag in the seat back which is set to have a narrow gap between the outer side frame and the seated occupant is not deteriorated.

In the vehicle seat according to the aspect, an upper surface of the side airbag in the state in which inflation and deployment is completed may become an inclined surface having a descending gradient toward the vehicle front side.

According to the aspect, the inclined surface presses the upper arm of the seated occupant from the vehicle rear side such that the upper arm can be pushed toward the upper side of the vehicle. As a result, it is difficult for the upper arm to be interposed between the chest of the seated occupant and the side airbag and thus, the chest is less likely to receive the load from the upper arm.

In the vehicle seat according to the aspect, a portion of the rear chamber that restrains the front portion of the waist may inflate and deploy into a shape in which a dimension of the portion in a vehicle up-down direction decrease toward the vehicle front side.

According to the aspect, with the above-described configuration, in a case where the rear chamber inflates and deploys at a high pressure in a state in which the occupant is positioned at an inappropriate position on the front side of the vehicle in the side portion of the seat back, the load applied to the occupant can be reduced.

In the vehicle seat according to the aspect, in a case where the seated occupant is a three-dimensional mannequin of a world side impact dummy AM50, the outer side frame may be disposed such that a portion of the outer side frame overlaps a back pan of the three-dimensional mannequin as viewed in a vehicle front-rear direction.

The "three-dimensional mannequin" described above is an SAE 3DM specified in SAE J826 in the SAE standard of the United States.

According to the aspect, with the above-described configuration, the outer side frame is disposed close to the seated occupant. Furthermore, as described above, the inflator is attached to the center side in the vehicle-width direction of the outer side frame disposed close to the seated occupant, and the inflator is stored in the rear chamber of the side airbag. Accordingly, the rear chamber is allowed to inflate and deploy fast at a higher pressure at a distance close to the seated occupant, so that the time taken for the movement of the seated occupant toward the center side in the vehicle-width direction by the rear chamber can be further reduced.

In the vehicle seat according to the aspect, the partition portion may be a tether disposed inside the side airbag.

According to the aspect, the side airbag is partitioned into the front chamber and the rear chamber by the tether disposed inside the side airbag. Accordingly, the inflation widths of the front chamber and the rear chamber in the vehicle-width direction can be increased. As a result, it is possible to improve the occupant protection performance of the front chamber and the rear chamber. In addition, it is possible to increase the pressing force toward the center side in the vehicle-width direction received by the seated occupant from the rear chamber, thereby effectively promoting the movement of the seated occupant toward the center side in the vehicle-width direction.

In the vehicle seat according to the aspect, the partition portion may be constituted by a front-rear partition portion and an up-down partition portion, and is formed in an L-shape in a case where the inflated and deployed state of the side airbag is viewed in the vehicle-width direction.

In the vehicle seat according to the aspect, the partition portion may be constituted by the front-rear partition portion that extends from an upper edge portion of the side airbag in a center portion of the side airbag in the vehicle front-rear direction toward a lower portion side of the side airbag, and the up-down partition portion that extends from a lower end of the front-rear partition portion toward a front edge portion side of the side airbag.

In the vehicle seat according to the aspect, the partition portion may be a sewn portion formed by sewing a base cloth of the side airbag.

According to the aspect, the side airbag is partitioned into the front chamber and the rear chamber by the sewn portion formed by sewing the base cloth of the side airbag. Accordingly, compared to a configuration in which the tether is disposed inside the side airbag, the configuration of the side airbag is simplified, and thus the side airbag can be folded into a small size. Accordingly, the mountability of the side airbag in the seat back is further improved.

In the vehicle seat according to the aspect, the outer side frame may include a side wall portion extending in the vehicle front-rear direction in the plan sectional view of the seat back, a front flange portion extending from a front end of the side wall portion toward a center side in the vehicle-width direction, and a rear flange portion extending from a rear end of the side wall portion toward the center side in the vehicle-width direction.

In the vehicle seat according to the aspect, the rear flange portion may have a larger dimension in a seat-width direction than a dimension of the front flange portion in the seat-width direction. A rib protruding inward in the seat-width direction may be formed at a center portion of the side wall portion in the vehicle front-rear direction. A rib protruding toward a seat front side may be formed at a center portion of the rear flange portion in the seat-width direction. The outer side frame may be disposed such that a portion of the rear flange portion overlaps a back pan of the three-dimensional mannequin as viewed in a seat front-rear direction.

As described above, in the vehicle seat with a side airbag apparatus, the seated occupant can be moved toward the center side in the vehicle-width direction fast at the time of a side collision. In addition, mounting of the side airbag in the seat back which is set to have a narrow gap between the outer side frame and the seated occupant is facilitated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a vehicle seat 10 with a side airbag apparatus 50 (hereinafter, abbreviated to a vehicle seat 10) according to an embodiment of the disclosure will be described with reference to FIGS. 1 to 4. Arrows FR, UP, OUT, which are appropriately described in each drawing, respectively indicate a forward direction (advancing direction), an upward direction, and an outward direction in a width direction of a vehicle. Hereinafter, in a case where descriptions are provided simply using a front-rear direction, a right-left direction, and an up-down direction, unless otherwise specified, the front-rear direction, the right-left direction, and the up-down direction respectively indicate forward and rearward in a vehicle front-rear direction, rightward and leftward in a vehicle right-left direction (vehicle-width direction), and upward and downward in a vehicle up-down direction. In each drawing, there may be cases where some reference numerals are omitted from the viewpoint of ease of viewing of the drawings.

Overall Configuration of Vehicle Seat 10

Figure 1:
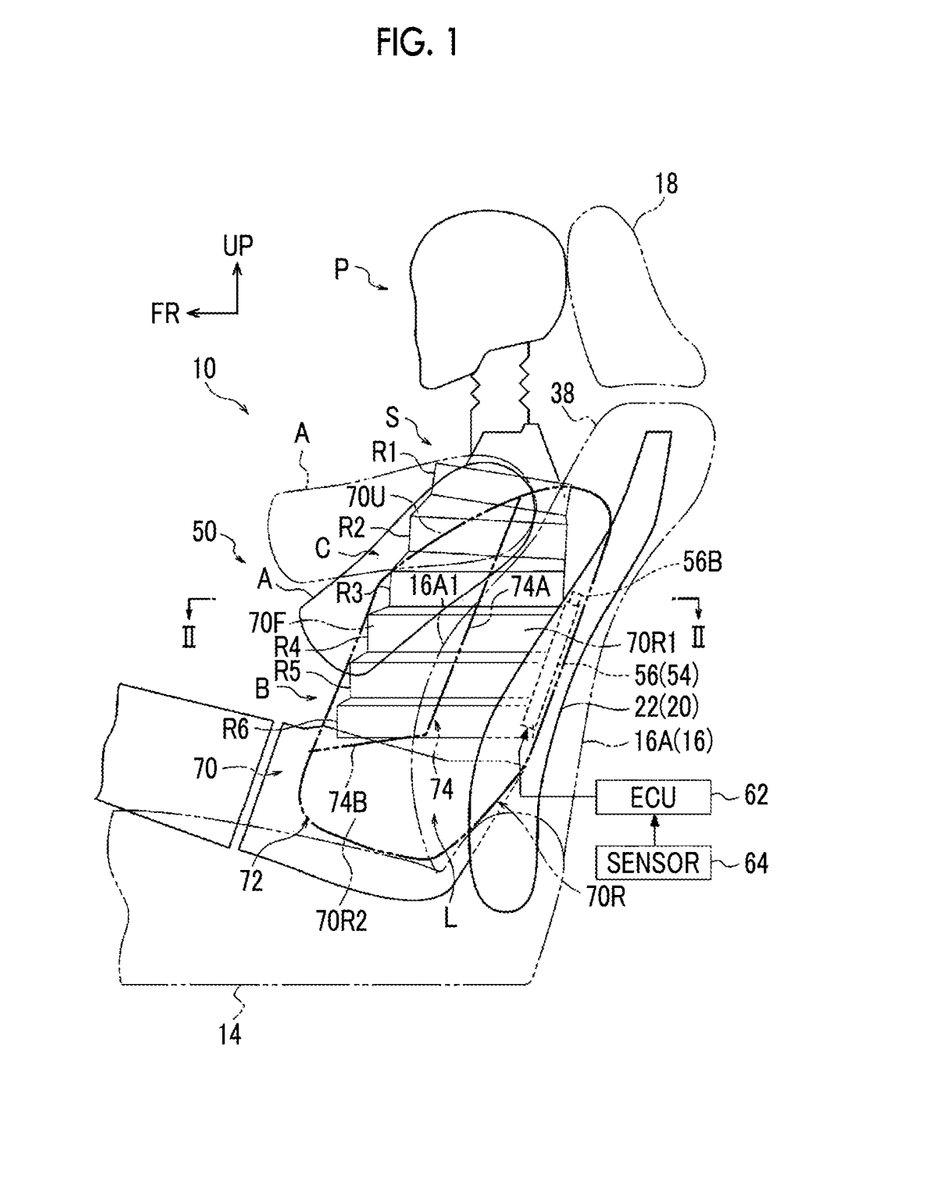
FIG. 1 is a schematic side view illustrating a state in which inflation and deployment of a side airbag is completed in a vehicle seat provided with a side airbag apparatus according to an embodiment of the disclosure.

First, the outline of the overall configuration of the vehicle seat 10 will be described, and thereafter the configuration of the side airbag apparatus 50, which is a main part of the embodiment, will be described. As illustrated in FIG. 1, the vehicle seat 10 includes a seat cushion 14, a seat back 16 reclinably connected to the rear end portion of the seat cushion 14, and a headrest 18 connected to the upper end portion of the seat back 16. In the vehicle seat 10, the side airbag apparatus 50 is mounted in a side portion (side support portion) 16A on the outside of the seat back 16 in the vehicle-width direction. The vehicle seat 10 is, for example, the driver's seat of a left-hand drive vehicle or the passenger seat of a right-hand drive vehicle, and is disposed on the left side in the vehicle cabin. A front-rear direction, a right-left direction (width direction), and an up-down direction of the vehicle seat 10 coincide with the vehicle front-rear direction, the vehicle right-left direction (width direction), and the vehicle up-down direction. In a case where the vehicle seat 10 is disposed on the right side in the vehicle cabin, the vehicle seat 10 has a configuration symmetrical to that of the embodiment.

Figure 2:
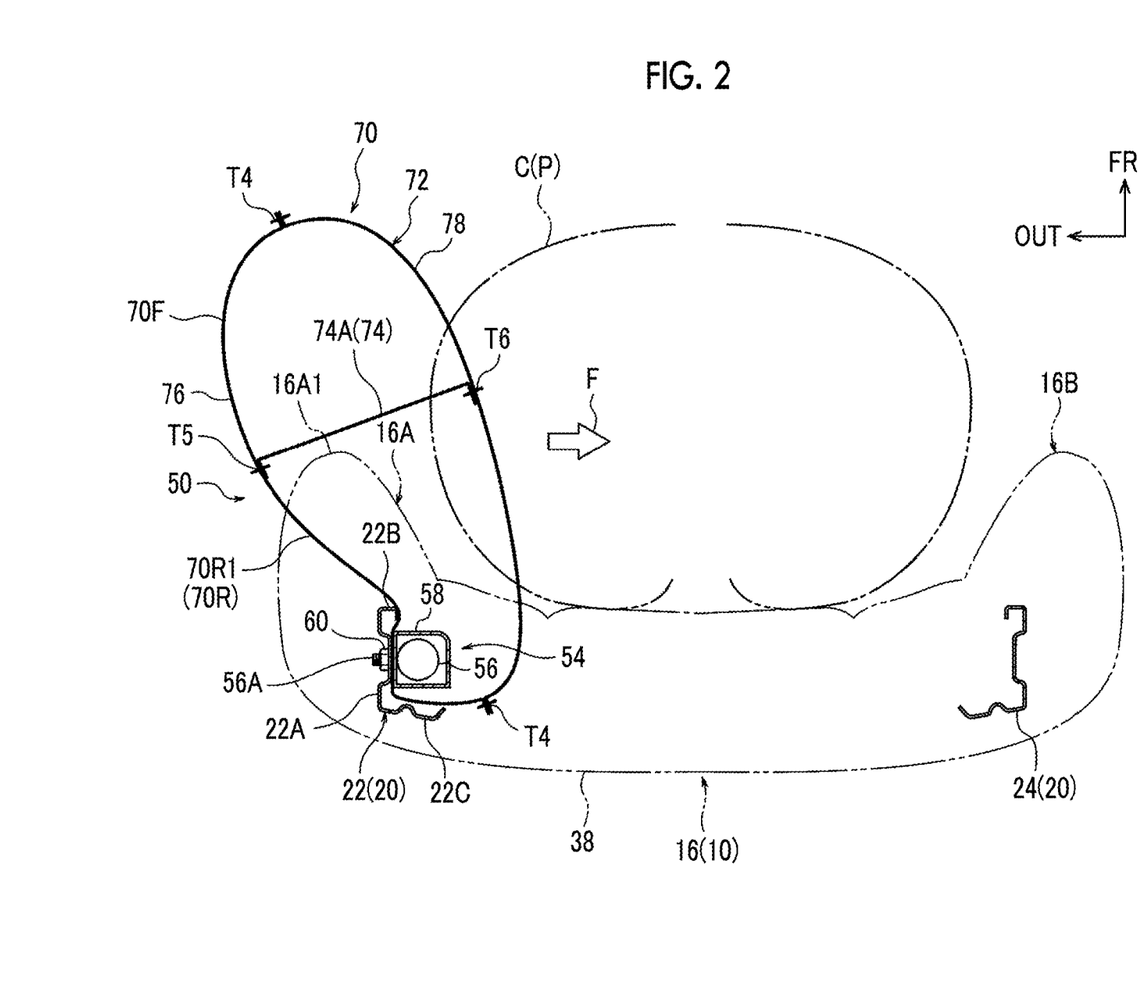
FIG. 2 is an enlarged sectional view illustrating a cut section taken along line II-II of FIG. 1.

In FIG. 1, a dummy P for a collision test is seated on the vehicle seat 10 instead of an actual occupant. In FIG. 2, a chest C of the dummy P is schematically illustrated by a two-dot chain line. The dummy P is the AM50 (the 50th percentile American male) of the World Side Impact Dummy (World SID). The dummy P is seated on the vehicle seat 10 by a seating method specified in a side collision test method. The forward and rear positions of the seat back 16 with respect to the vehicle and the inclination angle of the seat back 16 with respect to the seat cushion 14 are adjusted to reference setting positions corresponding to the above-mentioned seating method.

Six ribs R1, R2, R3, R4, R5, R6 are provided on the torso of the dummy P. There may be cases where the ribs R1, R2, R3, R4, R5, R6 are referred to as a "shoulder rib R1", an "upper chest rib R2", a "middle chest rib R3", a "lower chest rib R4", an "upper abdomen rib R5", and a "lower abdomen rib R6" in order from the top. The shoulder rib R1 is provided on a shoulder S of the dummy P. The upper chest rib R2, the middle chest rib R3, and the lower chest rib R4 are provided on the chest C of the dummy P. The upper abdomen rib R5 and the lower abdomen rib R6 are provided on an abdomen B of the dummy P. Hereinafter, there may be cases where the dummy P is referred to as a "seated occupant P".

Figure 3:
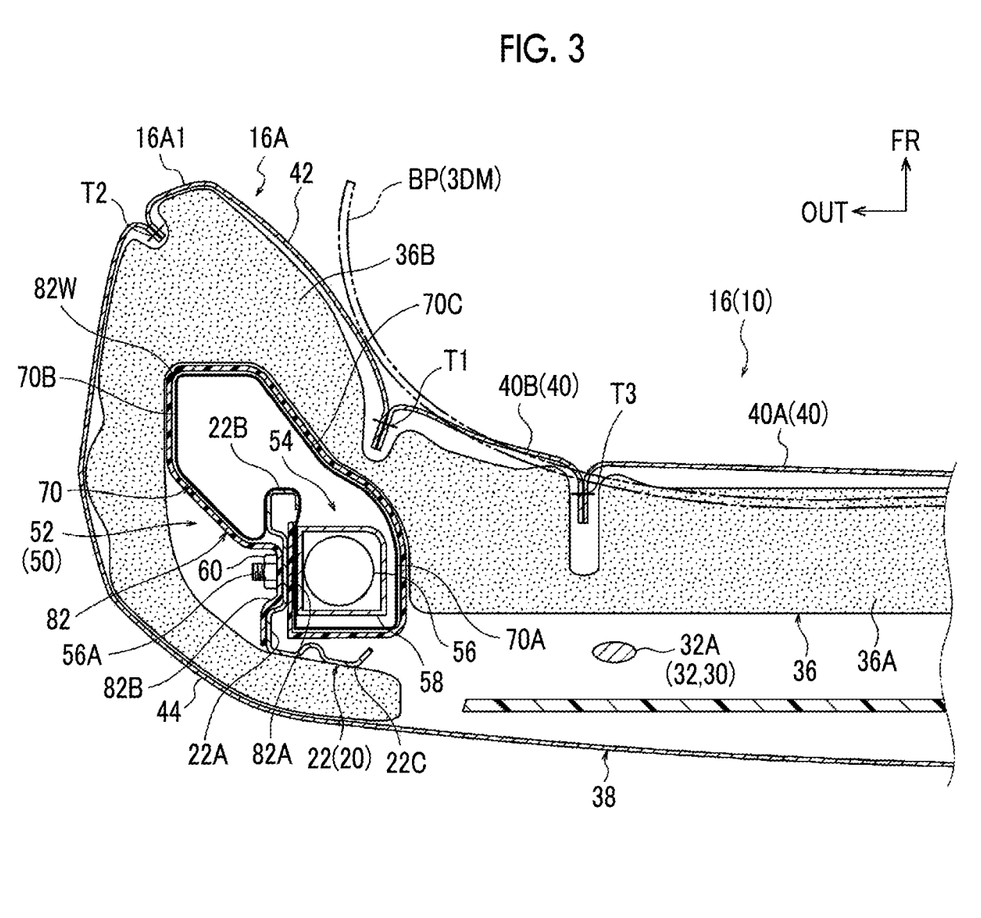
FIG. 3 is an enlarged plan sectional view illustrating a part of a seat back of the vehicle seat of FIG. 2, and is a view illustrating a stored state of the side airbag.

In addition, in FIG. 3, a back pan BP of a three-dimensional mannequin (hip-point mannequin) 3DM of the AM50 is indicated by a two-dot chain line. The three-dimensional mannequin 3DM is an SAE 3DM specified in SAE J826 in the SAE standard of the United States.

As illustrated in FIGS. 1 to 3, the seat back 16 of the vehicle seat 10 includes a seat back frame 20, a seat back spring 30 (not illustrated in the figures other than FIG. 3) attached to the seat back frame 20, a seat back pad 36 (not illustrated in the figures other than FIG. 3) covering the seat back frame 20, and a seat back skin 38 covering the seat back pad 36.

The seat back frame 20 is formed of metal, for example, and forms the frame of the seat back 16. The seat back frame 20 includes an outer side frame 22 which extends in the up-down direction of the seat back 16 in the side portion 16A on the outside of the seat back 16 in the vehicle-width direction, and an inner side frame 24 which extends in the up-down direction of the seat back 16 in a side portion (side support portion) 16B on the center side of the seat back 16 in the vehicle-width direction. Furthermore, the seat back frame 20 includes an upper frame (not illustrated) which connects the upper end portions of the outer side frame 22 and the inner side frame 24 in the vehicle-width direction, and a lower frame (not illustrated) which connects the lower end portions of the outer side frame 22 and the inner side frame 24 in the vehicle-width direction. In the following description, the side portion 16A is referred to as an "outer side portion 16A".

As illustrated in FIG. 3, the outer side frame 22 includes a side wall portion 22A extending in the vehicle front-rear direction in a plan sectional view of the seat back 16, a front flange portion 22B extending from the front end of the side wall portion 22A toward the center side in the vehicle-width direction (toward the inside in a seat-width direction), and a rear flange portion 22C extending from the rear end of the side wall portion 22A toward the center side in the vehicle-width direction. The rear flange portion 22C is set to have larger dimensions in the vehicle-width direction than those of the front flange portion 22B, and the outer side frame 22 has a substantially L-shape in the plan sectional view of the seat back 16. Ribs protruding inward in the seat-width direction are formed at the center portion of the side wall portion 22A in the vehicle front-rear direction, and ribs protruding toward a seat front side are formed at the center portion of the rear flange portion 22C in the seat-width direction. The outer side frame 22 is disposed such that a portion of the rear flange portion 22C (a portion on the center side in the vehicle-width direction) overlaps the back pan BP of the three-dimensional mannequin 3DM as viewed in the seat front-rear direction and the gap between the outer side frame 22 and the seated occupant P is set to be narrow. The inner side frame 24 has the same configuration except that the inner side frame 24 is formed in a shape bilaterally symmetrical to the outer side frame 22.

The seat back spring 30 illustrated in FIG. 3 is disposed between the outer side frame 22 and the inner side frame 24 and is constituted by a wire member 32 attached to the seat back frame 20, and a plate member (not illustrated) attached to the wire member 32. For example, the wire member 32 is formed by bending a metal wire rod. The wire member 32 includes a pair of right and left side spring portions 32A (the side spring portion 32A on the center side in the vehicle-width direction is not illustrated) extending in the up-down direction of the seat back 16 and is bridged between the upper frame and the lower frame of the seat back frame 20. For example, the plate member is formed by press-forming a sheet metal, and is attached to the seat front side of the wire member 32 in a posture in which a plate thickness direction is aligned with the front-rear direction of the seat back 16.

The seat back pad 36 illustrated in FIG. 3 is formed of a foamed body such as urethane foam and forms the cushioning material of the seat back 16. The seat back pad 36 integrally includes a pad center portion 36A and a pair of right and left pad side portions 36B (the pad side portion 36B on the center side in the vehicle-width direction is not illustrated) provided on both the right and left sides of the pad center portion 36A. The pad center portion 36A is disposed on the center side of the seat back 16 in the width direction, and is supported on a seat rear side by the seat back spring 30. The right and left pad side portions 36B are formed in a substantially C-shape open to the inside in the seat-width direction and store the outer side frame 22 and the inner side frame 24 therein. The pad side portion 36B protrudes toward the seat front side relative to the pad center portion 36A and has a shape that ensures side support properties for the seated occupant P.

The seat back skin 38 illustrated in FIG. 3 is formed of, for example, cloth, leather, or synthetic leather and forms the skin of the seat back 16. The seat back skin 38 has a front skin 40 covering the pad center portion 36A from the seat front side, a front side skin 42 covering the pad side portion 36B from the seat front side, and a rear side skin 44 which covers the pad side portion 36B from the outside in the seat-width direction and the seat rear side and covers the pad center portion 36A from the seat rear side. The front side skin 42 is sewn to the front skin 40 at a sewn portion T1 and is sewn to the rear side skin 44 at a sewn portion T2. The sewn portion T2 of the front side skin 42 and the rear side skin 44 is positioned in the vicinity of a front edge portion 16A1 (so-called "stile portion") of the outer side portion 16A. The sewn portion T2 is configured to tear open along with the pad side portion 36B when the side airbag 70, which will be described later, inflates and deploys. In the embodiment, the front skin 40 is configured such that skin pieces 40A, 40B are sewn to each other at a sewn portion T3 positioned closer to the inside in the seat-width direction than the sewn portion T1.

Configuration of Side Airbag Apparatus 50

As illustrated in FIGS. 1 to 3, the side airbag apparatus 50 includes a single gas generating device 54 mounted on the inner side of the outer side frame 22 in the seat-width direction, and a single side airbag 70 which receives gas from the gas generating device 54 to inflate and deploy. The gas generating device 54 and the side airbag 70 normally act as an airbag module 52 illustrated in FIG. 3, and are stored in the outer side portion 16A. The airbag module 52 is configured to include an enclosing member 82 illustrated in FIG. 3 (not illustrated in the figures other than FIG. 3).

The gas generating device 54 is constituted by a single inflator 56 and a single retainer 58 (not illustrated in FIG. 1). The inflator 56 and the retainer 58 are disposed inward of the side wall portion 22A of the outer side frame 22 in the seat-width direction and forward of the rear flange portion 22C in the seat front-rear direction. The inflator 56 is a so-called cylinder type inflator, and is formed in a cylindrical shape. The inflator 56 is disposed in a posture in which the axial direction (longitudinal direction) of the inflator 56 is aligned with the up-down direction of the seat back 16. The retainer 58 is a member, also called a diffuser, and is formed of metal in a substantially rectangular tube shape. The retainer 58 is disposed in a posture in which the axial direction of the retainer 58 is aligned with the up-down direction of the seat back 16, and the inflator 56 is inserted into the retainer 58. The retainer 58 has a function of rectifying gas generated from the inflator 56.

A pair of upper and lower stud bolts 56A (see FIGS. 2 and 3) protrudes from the outer peripheral portion of the inflator 56 toward the outside in the seat-width direction (outside in the vehicle-width direction). The stud bolt 56A penetrates through the retainer 58 and the side wall portion 22A and a nut 60 is screwed to the tip end side of each of the stud bolts 56A. Accordingly, the inflator 56 is fastened and fixed (so-called side-fastened) to the outer side frame 22 together with the retainer 58. The upper and lower stud bolts 56A are not limited to the configuration in which the upper and lower stud bolts 56A are provided in the inflator 56, and a configuration in which the upper and lower stud bolts 56A are provided in the retainer 58 may also be employed. In this case, for example, the inflator 56 is fixed to the retainer 58 by means of crimping or the like. In addition, a gap having a dimension of, for example, about 10 mm in the vehicle front-rear direction is set between the retainer 58 and the rear flange portion 22C such that assembly of the airbag module 52 into the outer side frame 22 is facilitated.

A gas ejecting portion 56B is provided at the upper end portion or the lower end portion (here, the upper end portion) of the inflator 56. The gas ejecting portion 56B is disposed at a height equal to the chest C of the seated occupant P. A plurality of gas ejecting ports (not illustrated) arranged in the peripheral direction of the inflator 56 is formed in the gas ejecting portion 56B. When the inflator 56 is activated (operated), gas is radially ejected from the plurality of gas ejecting ports. As illustrated in FIG. 1, a side collision ECU 62 mounted in the vehicle is electrically connected to the inflator 56. A side collision sensor 64 for detecting a side collision is electrically connected to the side collision ECU 62. The side collision ECU 62 is configured to activate the inflator 56 when a side collision is detected based on the output of the side collision sensor 64. For example, the side collision sensor 64 is configured to include a pressure sensor or an acceleration sensor (in-door sensor) disposed in the front side door or the rear side door, and an acceleration sensor (a sensor in the pillar) disposed in the B pillar.

In a case where a collision prediction sensor (pre-crash sensor) for predicting a side collision is electrically connected to the side collision ECU 62, the inflator 56 may be configured to be activated when the side collision ECU 62 predicts a side collision based on the signal from the collision prediction sensor. As the collision prediction sensor, for example, at least one of a millimeter-wave radar, a stereo camera, and an infrared laser capable of monitoring the front and sides of the vehicle can be applied.

Figure 4:
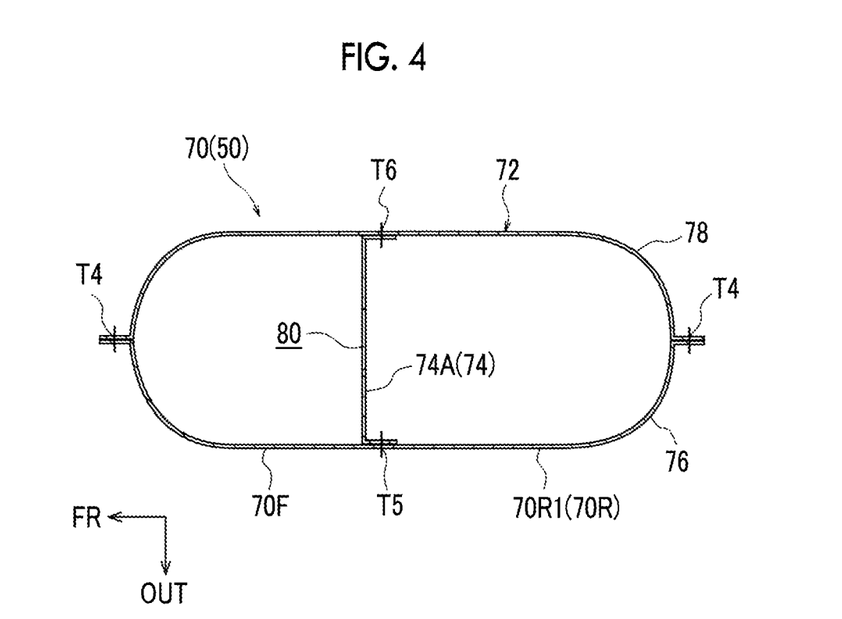
FIG. 4 is a plan sectional view illustrating the state in which inflation and deployment of the side airbag is completed according to the embodiment of the disclosure.

On the other hand, as illustrated in FIGS. 1, 2, and 4, the side airbag 70 is a so-called front-rear two-chamber side airbag. The side airbag 70 has a configuration in which a single bag body 72 is partitioned into a front chamber 70F and a rear chamber 70R by a tether 74 (partition wall; partition cloth) as a partition portion. For example, two sheets of base cloth 76, 78 (see FIGS. 2 and 4; reference numerals are omitted in the other figures) formed by cutting a nylon-based or polyester-based cloth material are overlapped with each other and the outer peripheral portions of the base cloth 76, 78 are sewn to each other at sewn portions T4 (see FIGS. 2 and 4; reference numerals are omitted in the other figures) such that the bag body 72 is formed in an elongated bag shape.

A method of manufacturing the bag body 72 is not limited to the above description and can be appropriately changed. For example, a configuration in which the bag body 72 is manufactured by folding a single sheet of base cloth into two and sewing the outer peripheral portions may be employed. In addition, for example, a configuration in which the bag body 72 is manufactured by a hollow weaving method (so-called OPW method) using an automatic loom may be employed. In the following description, the front-rear and up-down directions described regarding the side airbag 70 indicate the directions in a state in which inflation and deployment of the side airbag 70 is completed, and substantially coincide with the front-rear and up-down directions of the seat back 16.

For example, the tether 74 is formed by cutting the same cloth material as the base cloth 76, 78 of the side airbag 70 into a long band shape. As illustrated in FIGS. 2 and 4, in the tether 74, one long edge end portion is sewn to one base cloth 76 at a sewn portion T5 and the other long edge end portion is sewn to the other base cloth 78 at a sewn portion T6. The tether 74 is constituted by a front-rear partition portion 74A and an up-down partition portion 74B, and is formed in a substantially L-shape in a case where the inflated and deployed state of the side airbag 70 is viewed in the vehicle-width direction.

Specifically, the front-rear partition portion 74A extends from the upper edge portion of the side airbag 70 in the center portion of the side airbag 70 in the front-rear direction toward the lower portion side of the side airbag 70, and extends in the up-down direction of the side airbag 70. The up-down partition portion 74B extends from the lower end of the front-rear partition portion 74A toward the front edge portion side of the side airbag 70, and the front end portion of the up-down partition portion 74B reaches the front edge portion of the side airbag 70. A plurality of (here, three) communication ports 80 (see FIG. 4; not illustrated in the other figures) is formed in the front-rear partition portion 74A of the tether 74 so as to be arranged in the up-down direction of the side airbag 70. The front chamber 70F and the rear chamber 70R communicate with each other via the communication ports 80. The number of communication ports 80 is not limited to three and can be appropriately changed.

The gas generating device 54 described above is stored in the intermediate portion in the up-down direction at the rear end portion in the rear chamber 70R. The upper and lower stud bolts 56A of the inflator 56 penetrate through the base cloth 76 and the side wall portion 22A of the outer side frame 22 and are screwed to the nuts 60. Accordingly, the side airbag 70 is fastened and fixed to the outer side frame 22 by using the inflator 56 (the gas generating device 54). The gas generated by the inflator 56 in the rear chamber 70R is supplied to the front chamber 70F through the plurality of communication ports 80 formed in the front-rear partition portion 74A. Accordingly, the side airbag 70 is configured to inflate and deploy toward the seat front side of the outer side portion 16A and be interposed between the seated occupant P and a vehicle body side portion (not illustrated) (for example, the door trim of the front side door and the B pillar garnish).

As illustrated in FIG. 1, the side airbag 70 is formed to inflate and deploy in the up-down direction of the seat back 16 as its longitudinal direction and restrain the chest C, the abdomen B, and the waist L of the seated occupant P from the outside in the vehicle-width direction. In the inflated and deployed state of the side airbag 70, the front-rear partition portion 74A of the tether 74 extends in the up-down direction of the seat back 16 along the front edge portion 16A of the outer side portion 16A and faces the center portions of the chest C and the abdomen B of the seated occupant P in the front-rear direction. The up-down partition portion 74B of the tether 74 extends from the lower end of the front-rear partition portion 74A toward the vehicle front side along the waist L of the seated occupant P. Accordingly, the front chamber 70F separated from the rear chamber 70R by the front-rear partition portion 74A and the up-down partition portion 74B restrains the front portions of the chest C and the abdomen B of the seated occupant P. The rear chamber 70R is configured to restrain the rear portions of the chest C and the abdomen B and the front portion and the rear portion of the waist L.

Supplementally, the rear chamber 70R has a chest-abdomen restraint portion 70R1 for restraining the rear portions of the chest C and the abdomen B and a waist restraint portion 70R2 for restraining the front portion and the rear portion of the waist L and is formed in a substantially L-shape in a case where the inflated and deployed state is viewed in the vehicle-width direction. The chest-abdomen restraint portion 70R1 inflates and deploys primarily within the outer side portion 16A on the vehicle rear side of the front chamber 70F and restrains portions from the upper end portion of the rear portion of the chest C to the lower end portion of the rear portion of the abdomen B. The rear portion side of the waist restraint portion 70R2 which restrains the rear portion of the waist L inflates and deploys within the outer side portion 16A, and the front portion side of the waist restraint portion 70R2 which restrains the front portion of the waist L inflates and deploys toward the vehicle front side relative to the outer side portion 16A along with the front chamber 70F. The front portion side of the waist restraint portion 70R2 is separated from the front chamber 70F by the up-down partition portion 74B and inflates and deploys toward the vehicle lower side of the front chamber 70F. The up-down partition portion 74B is inclined so as to gradually descend toward the vehicle front side in the inflated and deployed state of the side airbag 70. In addition, the lower edge portion of the rear chamber 70R is inclined so as to gradually ascend toward the vehicle front side. Accordingly, the front portion side (the portion for restraining the front portion of the waist L) of the waist restraint portion 70R2 in the state in which inflation and deployment is completed is formed such that the dimensions in the vehicle up-down direction decrease toward the vehicle front side.

Furthermore, in the embodiment, as illustrated in FIG. 1, the upper surface of the side airbag 70 in the state in which inflation and deployment is completed is configured to serve as an inclined surface 70U having a descending gradient toward the vehicle front side. Specifically, the entire upper surface of the front chamber 70F in the state in which inflation and deployment is completed and the front portion side of the upper surface of the chest-abdomen restraint portion 70R1 in the state in which inflation and deployment is completed serve as the continuous inclined surface 70U having a descending gradient toward the vehicle front side. The inclined surface 70U presses an upper arm A of the seated occupant P from the vehicle rear side when the side airbag 70 inflates and deploys. Accordingly, a configuration in which the upper arm A is pushed upward by the inclined surface 70U toward the vehicle upper side (see the upper arm A indicated by the two-dot chain line in FIG. 1) is achieved.

As described above, the side airbag 70 having the above configuration and the gas generating device 54 normally act as the airbag module 52 illustrated in FIG. 3 and are stored in the outer side portion 16A. In FIG. 3, the side airbag 70 in the stored state is schematically illustrated solely by the outer shape line (outline) of the side airbag 70. The side airbag 70 in the stored state straddles the outer side frame 22 from the vehicle front side in the vehicle-width direction, and the portion including the front chamber 70F is folded outward of the outer side frame 22 in the vehicle-width direction.

That is, the side airbag 70 in the stored state is constituted by an inner storage portion 70A positioned on the center side of the outer side frame 22 in the vehicle-width direction together with the gas generating device 54, an outer storage portion 70B positioned outward of the outer side frame 22 in the vehicle-width direction, and a connection portion 70C which connects the inner storage portion 70A and the outer storage portion 70B on the vehicle front side of the outer side frame 22. The side airbag 70 in the stored state is mainly folded in the outer storage portion 70B. The outer storage portion 70B is folded by a folding method including any of bellows folding, roll folding, and vertical folding, or a folding method in which these are appropriately combined.

The outer storage portion 70B is disposed closer to the vehicle front side than the inner storage portion 70A and is disposed closer to the vehicle front side than the nut 60. Most of the outer storage portion 70B is positioned closer to the vehicle front side than the front flange portion 22B of the outer side frame 22. On the other hand, most of the inner storage portion 70A is positioned closer to the vehicle rear side than the front flange portion 22B. Accordingly, the airbag module 52 including the side airbag 70 in the folded state is inclined along the front side skin 42 that forms the surface of the outer side portion 16A on the seated occupant P side.

Furthermore, in the embodiment, the side airbag 70 stored in the outer side portion 16A as described above is surrounded by the enclosing member 82 (see FIG. 3, not illustrated in the other figures) in the plan sectional view of the seat back 16. The enclosing member 82 is formed of a resin or a cloth impregnated with a resin (for example, a nonwoven fabric such as felt), and is formed in a shape that surrounds the side airbag 70 in the stored state in the plan sectional view of the seat back 16. The enclosing member 82 has rigidity that can hold its own shape.

One end portion 82A of the enclosing member 82 is interposed between the retainer 58 and the side wall portion 22A on the inside of the outer side frame 22 in the seat-width direction. The stud bolt 56A of the inflator 56 penetrates through one end portion 82A of the enclosing member 82. The other end portion 82B of the enclosing member 82 is disposed outward of the outer side frame 22 in the seat-width direction. The stud bolt 56A of the inflator 56 penetrates through the other end portion 82B of the enclosing member 82 and is screwed to the nut 60. Accordingly, the enclosing member 82 is locked to (here, fastened and fixed to) the outer side frame 22, and the folded state of the side airbag 70 is held by the enclosing member 82.

In the enclosing member 82, a weak portion 82W is formed in a corner section on the vehicle front side and on the outside in the vehicle-width direction. At the weak portion 82W, for example, the corner section of the enclosing member 82 is formed to be locally thin and extends in the up-down direction of the seat back 16. The weak portion 82W is configured to easily break (tear open) by the inflation pressure of the side airbag 70. As a result of the breaking, the front portion side of the enclosing member 82 is divided in the seat-width direction, and the side airbag 70 is allowed to inflate and deploy. The weak portion 82W is not limited to the corner section of the enclosing member 82 which is formed to be locally thin, and the configuration thereof can be appropriately changed. For example, a configuration in which the weak portion 82W is formed by forming a plurality of slits, holes, or the like in the corner section in the up-down direction of the seat back 16 may be employed.

Operation and Effects

Next, the operation and effects of the embodiment will be described.

In the vehicle seat 10 having the above configuration, when the side collision ECU 62 detects a side collision of the vehicle based on the output of the side collision sensor 64, the inflator 56 attached to the center side of the outer side frame 22 in the vehicle-width direction is operated. The rear chamber 70R of the side airbag 70 having the inflator 56 stored therein then inflates and deploys faster at a higher pressure than the front chamber 70F while receiving a reaction force toward the center side in the vehicle-width direction from the outer side frame 22 such that the seated occupant P is pressed toward the center side in the vehicle-width direction (see an arrow F in FIG. 2). Accordingly, the seated occupant P can be moved toward the center side in the vehicle-width direction fast.

Furthermore, as illustrated in FIG. 3, the side airbag 70 is stored in the outer side portion 16A in a state in which the side airbag 70 straddles the outer side frame 22 from the vehicle front side in the vehicle-width direction and the portion including the front chamber 70F is folded outward of the outer side frame 22 in the vehicle-width direction (on the opposite side of the outer side frame 22 from the seated occupant P). Accordingly, mounting of the side airbag 70 in the seat back 16 which is set to have a narrow gap between the outer side frame 22 and the seated occupant P is facilitated.

A supplement to the above effects will be described. The side airbag 70 has a simple structure in which the single bag body 72 is partitioned into the front chamber 70F and the rear chamber 70R by the tether 74, and the rear chamber 70R is configured to press the seated occupant P toward the center side in the vehicle-width direction. Accordingly, an auxiliary airbag and an inward inflation airbag described in "BACKGROUND" are not needed, and the overall configuration of the side airbag 70 is downsized. Then, the side airbag 70 which is simple and small is stored while straddling the outer side frame 22 in the vehicle-width direction. Accordingly, the mountability of the side airbag 70 in the seat back 16 which is set to have a narrow gap between the outer side frame 22 and the seated occupant P is improved.

In the embodiment, the front chamber 70F in the state in which inflation and deployment is completed restrains the front portions of the chest C and the abdomen B of the seated occupant P. The rear chamber 70R in the state in which inflation and deployment is completed restrains the rear portions of the chest C and the abdomen B of the seated occupant P and the front portion and the rear portion of the waist L of the seated occupant P. That is, the rear chamber 70R which inflates and deploys faster at a higher pressure than the front chamber 70F while receiving a reaction force toward the center side in the vehicle-width direction from the outer side frame 22 restrains a wide range from the chest C to the waist L of the seated occupant P (toward the center side in the vehicle-width direction). Accordingly, a pressing force toward the center side in the vehicle-width direction is easily exerted on the center of gravity of the seated occupant (dummy) P. Moreover, since the rear chamber 70R presses the front portion and the rear portion of the waist L of the seated occupant P, compared to a case where the rear portion of the waist L is solely pressed by the rear chamber, the pressing direction of the waist L is likely to follow the vehicle-width direction. From the above description, it becomes possible to effectively move the seated occupant P toward the center side in the vehicle-width direction.

Furthermore, in the embodiment, the enclosing member 82 locked to the outer side frame 22 normally surrounds the side airbag 70 stored in the outer side portion 16A in the plan sectional view of the seat back 16. Accordingly, the portion including the front chamber 70F side in the side airbag 70 in the stored state, that is, the outer storage portion 70B folded outward of the outer side frame 22 in the vehicle-width direction, can be held in the folded state with a simple configuration. Moreover, since the weak portion 82W which breaks by the inflation pressure of the side airbag 70 is formed in the enclosing member 82, it is possible to allow the side airbag 70 to inflate and deploy with a simple configuration.

In addition, since the enclosing member 82 is formed of a resin or a cloth impregnated with a resin, compared to a case where the enclosing member 82 is formed of a cloth, paper, or the like, the folded state of the side airbag 70 can be firmly held. In addition, since the folded state of the side airbag 70 can be held by the enclosing member 82 before the airbag module 52 is assembled to the outer side frame 22, the assembly of the airbag module 52 to the outer side frame 22 is improved. Furthermore, since it is difficult for the load from the seated occupant P in the normal state to be applied to the side airbag 70 in the stored state, the folded state of the side airbag 70 can be maintained in the initial state of assembly over a long period of time.

In addition, in the embodiment, as illustrated in FIG. 3, in the side airbag 70 stored in the outer side portion 16A, the outer storage portion 70B positioned outward of the outer side frame 22 in the vehicle-width direction is disposed to be offset toward the vehicle front side from the inner storage portion 70A positioned on the center side of the outer side frame 22 in the vehicle-width direction. Accordingly, the outer storage portion 70B of the side airbag 70, that is, the portion folded outward of the outer side frame 22 in the vehicle-width direction easily inflate and deploy toward the vehicle front side. Furthermore, since the side airbag 70 in the stored state has an outer shape along the surface of the outer side portion 16A on the seated occupant P side in the plan sectional view of the seat back 16, the mountability of the side airbag 70 in the seat back 16 which is set to have a narrow gap between the outer side frame 22 and the seated occupant P is not deteriorated. Moreover, since the outer storage portion 70B is positioned closer to the vehicle front side than the nut 60, the outer storage portion 70B does not become an obstacle when the inflator 56 is fastened and fixed to the outer side frame 22.

Furthermore, in the embodiment, the upper surface of the side airbag 70 in the state in which inflation and deployment is completed becomes the inclined surface 70U having a descending gradient toward the vehicle front side. The inclined surface 70U presses the upper arm A of the seated occupant P from the vehicle rear side such that the upper arm A can be pushed toward the upper side of the vehicle. As a result, it is difficult for the upper arm A to be interposed between the chest C of the seated occupant P and the side airbag 70 and thus, the chest C is less likely to receive the load from the upper arm A.

Furthermore, in the embodiment, the front portion side of the waist restraint portion 70R2 provided in the rear chamber 70R inflates and deploys into a shape in which the dimensions in the vehicle up-down direction decrease toward the vehicle front side. Therefore, in a case where the rear chamber 70R inflates and deploys at a high pressure in a state in which the occupant is positioned at an inappropriate position (out of position (OOP)) on the front side of the vehicle in the outer side portion 16A, the load applied to the occupant can be reduced. Therefore, so-called OOP performance can be improved.

In the embodiment, in a case where the seated occupant P is the three-dimensional mannequin 3DM of the AM50, the outer side frame 22 is disposed such that a portion of the outer side frame 22 overlaps the back pan BP of the three-dimensional mannequin 3DM as viewed in the vehicle front-rear direction. Accordingly, the outer side frame 22 is disposed close to the seated occupant P. Furthermore, as described above, the inflator 56 is attached to the center side in the vehicle-width direction of the outer side frame 22 disposed close to the seated occupant P, and the inflator 56 is stored in the rear chamber 70R of the side airbag 70. Accordingly, the rear chamber 70R is allowed to inflate and deploy fast at a higher pressure at a distance close to the seated occupant P, so that the time taken for the movement of the seated occupant P toward the center side in the vehicle-width direction by the rear chamber 70R can be further reduced.

Furthermore, in the embodiment, the side airbag 70 is partitioned into the front chamber 70F and the rear chamber 70R by the tether 74 disposed inside the side airbag 70. Accordingly, the inflation widths of the front chamber 70F and the rear chamber 70R in the vehicle-width direction can be increased. As a result, it is possible to improve the occupant protection performance of the front chamber 70F and the rear chamber 70R. In addition, it is possible to increase the pressing force toward the center side in the vehicle-width direction received by the seated occupant P from the rear chamber 70R, thereby effectively promoting the movement of the seated occupant P toward the center side in the vehicle-width direction.

In addition, in the embodiment, since the gas ejecting portion 56B provided at the upper end portion of the inflator 56 is disposed at a height equal to the chest C of the seated occupant P, the rear chamber 70R starts to inflate faster near the scapula of the seated occupant P by the gas ejected from the gas ejecting portion 56B. Accordingly, it is possible to press the scapula having a relatively high load tolerance in the body of the seated occupant P toward the center side in the vehicle-width direction fast. Therefore, the movement of the seated occupant P toward the center side in the vehicle-width direction can be more effectively promoted.

Supplemental Description of Embodiment

In the embodiment, the configuration in which the gas ejecting portion 56B is provided at the upper end portion of the inflator 56 is employed, but the disclosure is not limited thereto, and a configuration in which the gas ejecting portion 56B is provided at the lower end portion of the inflator 56 may also be employed. In this case, the gas ejecting portion 56B is disposed near the lower end portion of the seat back frame 20 (a portion connected to a seat cushion frame (not illustrated)). Accordingly, it is possible to reduce the deflection of the seat back frame 20 at the time of gas ejection from the gas ejecting portion 56B.

Figure 5:
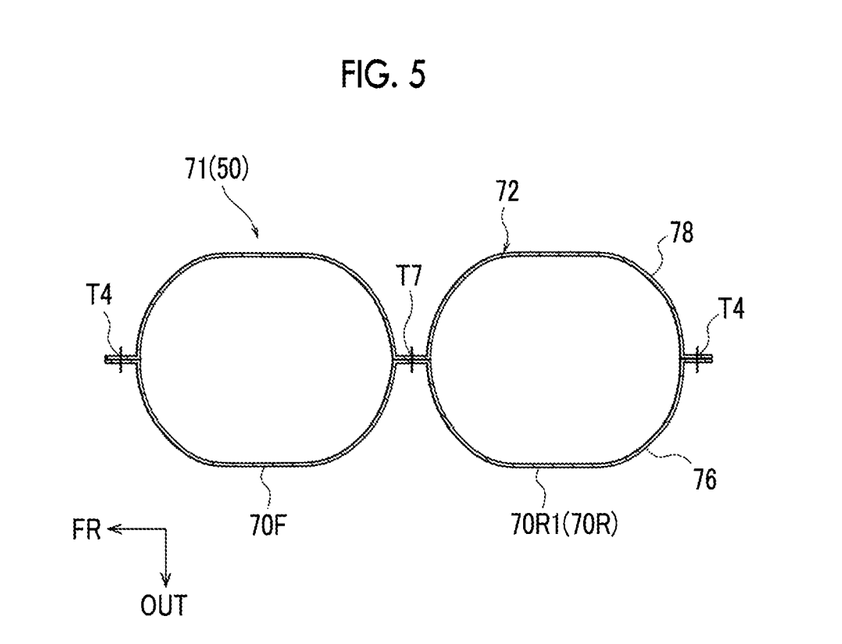
FIG. 5 is a plan sectional view illustrating a modification example of the side airbag, which corresponds to FIG. 4.

In the embodiment, the bag body 72 of the side airbag 70 is configured to be partitioned into the front chamber 70F and the rear chamber 70R by the tether 74, but the disclosure is not limited thereto. As in a side airbag 71 (first modification example) illustrated in FIG. 5, a configuration in which a sewn portion T7 formed by sewing the base cloth 76, 78 serves as a partition portion may also be employed. In this case, the sewn portion T7 is partially omitted such that the communication ports 80 (not illustrated in FIG. 5) are formed. In the side airbag 71, the configuration of the side airbag 71 is further simplified and thus, the side airbag 71 can be folded into a small size. Therefore, the mountability of the side airbag 71 in the seat back 16 is further improved.

In the embodiment, the case where the enclosing member 82 is formed of a resin or a cloth impregnated with a resin is described, but the disclosure is not limited thereto, and the material of the enclosing member 82 can be appropriately changed. For example, a configuration like a second modification example illustrated in FIG. 6 may be employed. In the second modification example, an enclosing member 90 is formed of a flexible sheet-shaped material (for example, cloth or paper). The enclosing member 90 surrounds the side airbag 70 in the stored state from the vehicle front side, the center side in the vehicle-width direction, and the outside in the vehicle-width direction in the plan sectional view of the seat back 16. One end portion 90A of the enclosing member 90 positioned on the center side of the inner storage portion 70A in the vehicle-width direction is locked to the side airbag 70 by means of sewing or the like. The other end portion 90B of the enclosing member 90 is locked to the outer side frame 22 in the same manner as the enclosing member 82, and the folded state of the side airbag 70 is held by the enclosing member 90.

Figure 6:
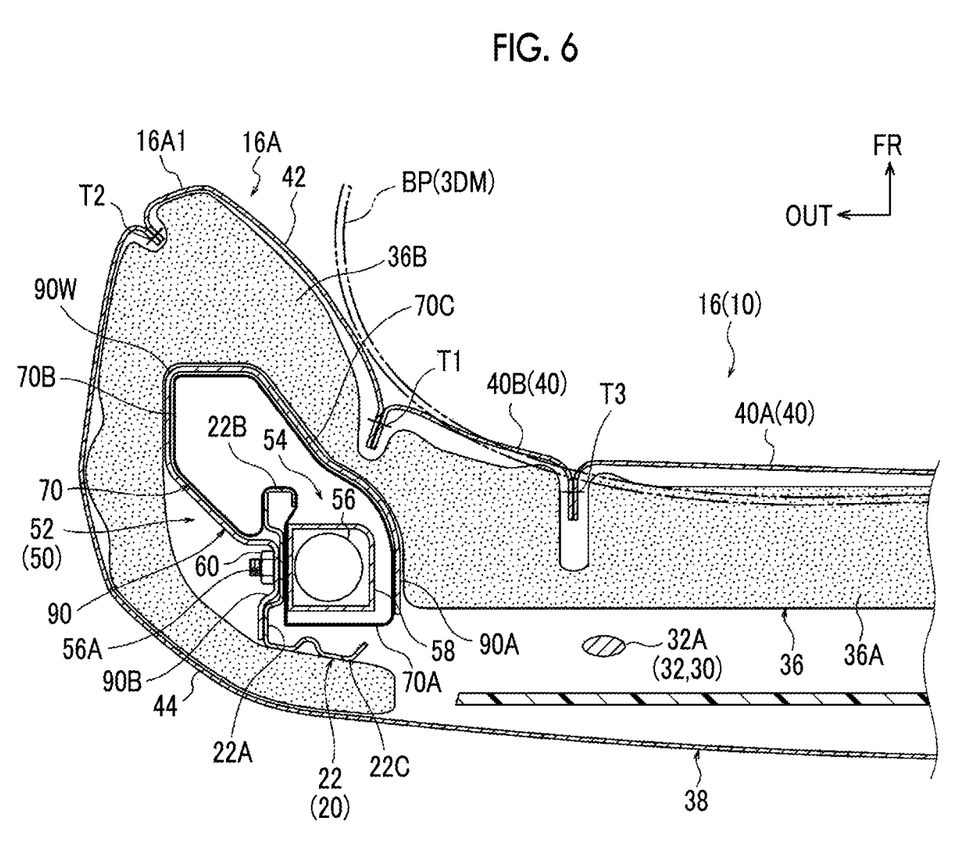
FIG. 6 is a plan sectional view illustrating a modification example of an enclosing member, which corresponds to FIG. 3.

In the enclosing member 90, a weak portion 90W is formed in a corner section on the seat front side and on the outside in the seat-width direction. The weak portion 90W is weakened, for example, by forming a plurality of slits, holes, or the like in the corner section in the up-down direction of the seat back 16. The weak portion 90W is configured to break by the inflation pressure of the side airbag 70. Also in the modification example, the side airbag 70 can be held in the folded state with a simple configuration and the inflation and deployment of the side airbag 70 can be allowed. Furthermore, since the enclosing member 90 is formed of cloth, paper, or the like, the configuration can be further simplified.

In the embodiment, the enclosing member 82 is configured to be locked to the outer side frame 22 using the stud bolt 56A of the inflator 56, but the disclosure is not limited thereto. The method of locking the enclosing member 82 to the outer side frame 22 can be appropriately changed. For example, the enclosing member 82 may be configured to be locked to the outer side frame 22 by using a clip, an adhesive tape, or the like. This is also applied to the enclosing member 90 described above.

In the embodiment and the second modification example, the configuration in which the enclosing members 82, 90 are provided are employed, but the disclosure is not limited thereto, and a configuration in which the enclosing members 82, 90 are omitted may be employed. However, even in this case, it is preferable to provide holding means for holding the side airbag 70 in the stored state to be in a folded state.

Furthermore, in the embodiment, the portion of the outer side frame 22 is configured to overlap the back pan BP of the three-dimensional mannequin 3DM seated on the vehicle seat 10 as viewed in the vehicle front-rear direction, but the disclosure is not limited thereto. A configuration in which the outer side frame 22 is disposed at a position at which the outer side frame 22 does not overlap the back pan BP may also be employed.

In the embodiment, the front chamber 70F in the state in which inflation and deployment is completed is configured to restrain the front portions of the chest C and the abdomen B of the seated occupant P, and the rear chamber 70R in the state in which inflation and deployment is completed is configured to restrain the rear portions of the chest C and the abdomen B and the front portion and the rear portion of the waist L of the seated occupant P, but the disclosure is not limited thereto. The restrained points of the seated occupant P by the front chamber 70F and the rear chamber 70R, and the shapes of the front chamber 70F and the rear chamber 70R can be appropriately changed.

Besides, the disclosure can be implemented with various modifications without departing from the gist thereof. The scope of the disclosure is not limited to the embodiment.

What is claimed is:

1. A vehicle seat with a side airbag apparatus, comprising:
    an outer side frame disposed in a side portion on an outside of a seat back in a vehicle-width direction;
    an inflator attached to a center side of the outer side frame in the vehicle-width direction; and
    a side airbag that stores the inflator, wherein:
    the side airbag includes a partition portion that partitions the side airbag into a front chamber and a rear chamber;
    the partition portion includes a communication port;
    the inflator is stored in the rear chamber;
    the rear chamber is configured to inflate and deploy faster at a higher pressure than the front chamber; and
    the side airbag is stored in the side portion in a state in which the side airbag straddles the outer side frame from a vehicle front side in the vehicle-width direction and a portion of the side airbag including the front chamber is folded outward of the outer side frame in the vehicle-width direction.

2. The vehicle seat according to claim 1, wherein the front chamber in a state in which inflation and deployment is completed is configured to restrain front portions of a chest and an abdomen of a seated occupant, and the rear chamber in the state in which inflation and deployment is completed is configured to restrain rear portions of the chest and the abdomen of the seated occupant and a front portion and a rear portion of a waist of the seated occupant.

3. The vehicle seat according to claim 1, further comprising an enclosing member that is locked to the outer side frame and surrounds the side airbag stored in the side portion in a plan sectional view of the seat back,
    wherein the enclosing member includes a weak portion which breaks by an inflation pressure of the side airbag.

4. The vehicle seat according to claim 3, wherein the enclosing member is formed of a resin or a cloth impregnated with a resin.

5. The vehicle seat according to claim 3, wherein the enclosing member is formed of a flexible sheet-shaped material.

6. The vehicle seat according to claim 1, wherein, in the side airbag stored in the side portion, a portion of the side airbag positioned outward of the outer side frame in the vehicle-width direction is disposed to be offset toward the vehicle front side from a portion of the side airbag positioned on the center side of the outer side frame in the vehicle-width direction.

7. The vehicle seat according to claim 1, wherein an upper surface of the side airbag in the state in which inflation and deployment is completed becomes an inclined surface having a descending gradient toward the vehicle front side.

8. The vehicle seat according to claim 2, wherein a portion of the rear chamber that restrains the front portion of the waist inflates and deploys into a shape in which a dimension of the portion in a vehicle up-down direction decrease toward the vehicle front side.

9. The vehicle seat according to claim 1, wherein, in a case where a seated occupant is a three-dimensional mannequin of a world side impact dummy AM50, the outer side frame is disposed such that a portion of the outer side frame overlaps a back pan of the three-dimensional mannequin as viewed in a vehicle front-rear direction.

10. The vehicle seat according to claim 1, wherein the partition portion is a tether disposed inside the side airbag.

11. The vehicle seat according to claim 10, wherein the partition portion is constituted by a front-rear partition portion and an up-down partition portion, and is formed in an L-shape in a case where the inflated and deployed state of the side airbag is viewed in the vehicle-width direction.

12. The vehicle seat according to claim 10, wherein the partition portion is constituted by a front-rear partition portion that extends from an upper edge portion of the side airbag in a center portion of the side airbag in a vehicle front-rear direction toward a lower portion side of the side airbag, and an up-down partition portion that extends from a lower end of the front-rear partition portion toward a front edge portion side of the side airbag.

13. The vehicle seat according to claim 1, wherein the partition portion is a sewn portion formed by sewing a base cloth of the side airbag.

14. The vehicle seat according to claim 1, wherein the outer side frame includes a side wall portion extending in a vehicle front-rear direction in a plan sectional view of the seat back, a front flange portion extending from a front end of the side wall portion toward a center side in the vehicle-width direction, and a rear flange portion extending from a rear end of the side wall portion toward the center side in the vehicle-width direction.

15. The vehicle seat according to claim 14, wherein:
    the rear flange portion has a larger dimension in a seat-width direction than a dimension of the front flange portion in the seat-width direction;
    a rib protruding inward in the seat-width direction is formed at a center portion of the side wall portion in the vehicle front-rear direction:
    a rib protruding toward a seat front side is formed at a center portion of the rear flange portion in the seat-width direction; and
    the outer side frame is disposed such that a portion of the rear flange portion overlaps a back pan of a three-dimensional mannequin as viewed in a seat front-rear direction.

* * * * *